United States Patent

Mouzon

[11] Patent Number: 5,410,863
[45] Date of Patent: May 2, 1995

[54] SINGLE SHAFT HARNESS DEVICE FOR HORSE-DRAWN VEHICLE

[76] Inventor: Alain Mouzon, 41, Grande Rue, 60460 Blaincourt Les Precy, France

[21] Appl. No.: 184,035
[22] Filed: Jan. 21, 1994
[51] Int. Cl.⁶ .................................................. B68B 1/00
[52] U.S. Cl. .......................................... 54/39.1; 54/2
[58] Field of Search ................ 54/2, 38.1, 39.1, 41.1; 280/75

[56] References Cited

U.S. PATENT DOCUMENTS

| | | | |
|---|---|---|---|
| 430,303 | 6/1890 | Simpson | 54/2 |
| 3,835,621 | 9/1974 | Gorenschek | |
| 3,847,408 | 11/1974 | King | 54/39.1 X |
| 3,942,305 | 3/1976 | Cameron | 54/2 |
| 3,944,243 | 3/1976 | Yates | 280/63 |
| 5,076,041 | 12/1991 | Proust | 54/2 |

FOREIGN PATENT DOCUMENTS 2589418 5/1987 France .
16774 2/1914 United Kingdom .

Primary Examiner—Robert P. Swiatek
Attorney, Agent, or Firm—Young & Thompson

[57] ABSTRACT

Harness device for horse-drawn vehicles, comprising in combination a saddle bow (6) having a pommel (15) and a cantle (16) and a length between the pommel and the cantle of at least about 350 mm, extending forwardly of each side of the withers (19) of a horse and comprising padding over all the surface bearing on the back of the horse. Two pairs of lateral straps (9, 10) are adjustable as to length and are mounted on the flanks of the saddle bow and connected to a belly band (11). A spherical ball (4) is fixedly secured to the pommel of the saddle bow, and projects upwardly. A forward end of a shaft (2) for drawing the vehicle bears a socket (3) of a shape matching that of the spherical ball. The socket encloses the ball and is adapted to incline in all directions on the ball. The sphere (4) is inclined forwardly upwardly lengthwise of the horse at an angle ($\alpha$) of about 7° with respect to the vertical. The forward lateral strap (9) bears on the saddle bow at a forwardmost point and the rear strap (10) bears on the rear of the saddle bow such that the resultant of the forces exerted on the sphere and applied to the saddle bow will be parallel to the plane defined by the belly band.

6 Claims, 2 Drawing Sheets

SINGLE SHAFT HARNESS DEVICE FOR HORSE-DRAWN VEHICLE

FIELD OF THE INVENTION

The present invention relates to a new single shaft harness device for a horse-drawn vehicle.

BACKGROUND OF THE INVENTION

The harnesses for single shaft horse-drawn vehicles have existed since ancient times: even the Sumerians (about 3000 BC) used the principle of a single dorsal shaft on their chariots, the shaft being attached to the horse by a neck collar. But this type of harness required distributing the forces among several horses harnessed in front.

This technique was totally abandoned by the beginning of the 20th century, when several new arrangements were proposed:

first there was proposed a harness articulated to a small saddle about a vertical axis of articulation, the small saddle being mounted on the horse by a shoulder collar. This device was more particularly intended for agricultural use and the pivotal articulation permitted easily maneuvering at the end of the field. However it only permitted movement in the direction of the furrow.

another device described in U.S. Pat. No. 3,847,408: the shaft is mounted on a small saddle in a semi-rigid fashion which permits avoiding veering during trotting. The small saddle is strapped in a conventional manner by means of belly bands and maintained in longitudinal position by a collar of the hunting collar type and a thong which passes about the forehead of the horse, which prevents rearward displacement. However, this harness does not permit sharp turns and can be used only on flat straightaways or very wide curves. Moreover, the collar and the forehead thong do not assure the desired position and rapidly become excessively tightened which considerably troubles the animal.

a recent solution described in WO 89.057.48 proposes a single shaft mounted on a traction cradle connected to a harness. This cradle rests on the back of the horse by means of two cushions which bear on the superficial muscles at the junction of the back, of the withers, and of the shoulder. The shaft is articulated on the cradle about a vertical pivotal axis. This device, if it is suitable on flat terrain, is however not satisfactory because the pads bruise the horse, and on broken ground the cradle has a tendency to slide laterally on the back along sloping paths. Thus the tractive forces are badly distributed not only in the vertical plane but also in the horizontal plane.

Thus when the shaft is coupled to a collar which bears forwardly or in vertical alignment with the withers, the tractive forces can be great but impede the movements and wound the horse, and when a small harness saddle is maintained in a known manner, by straps forward of the withers, it does not permit resisting high tractive forces and the pivotal articulation gives rise to undesirable veering.

SUMMARY OF THE INVENTION

The present invention aims to solve these problems and to provide a light harness usable for walking on all terrain, and when racing.

The invention has for its object a harness device for a horse drawn vehicle characterized in that it comprises in combination:

a saddle bow of a length between the pommel and the cantle of at least about 350 mm, prolonged forwardly on each side of the withers and comprising padding over all the surface that bears on the back of the horse, two pairs of lateral straps of adjustable length mounted in known manner on the flanks of the bow and connected to a belly band, a ball joint integrally affixed at the forward end of the pommel of the bow, projecting upwardly, and the forward end of the shaft comprises a cup, of a type known per se, of a shape corresponding to the spherical ball and such that the cup can incline in all directions on the sphere.

The invention is further particularized by the following characteristics:

the sphere is forwardly inclined along the longitudinal axis of the horse at an angle of about 7° with respect to the vertical;

the bow is a bow of the cavalry saddle type;

the lateral forward strap comes into engagement on the bow at the most advanced point and the rear strap comes into engagement at the rear such that the resultant of the forces exerted on the sphere and applied to the bow will be parallel to the plane defined by the belly band;

the belly band is of a minimum width of 70 mm and preferably 150 mm;

moreover the device is completed by a hunting collar used as a breast collar, and by a crupper-loop.

The invention also relates to the complete saddle, which is to say utilizable as a mounting, characterized in that the pommel comprises at its forward end a securement member, integrated into the body of the pommel, adapted to receive a rod bearing a sphere for the universal joint of a harness.

BRIEF DESCRIPTION OF THE DRAWINGS

So as better to understand the invention, there is shown an embodiment in the accompanying drawings, in which.

DETAILED DESCRIPTION OF THE INVENTION

Figure 1:
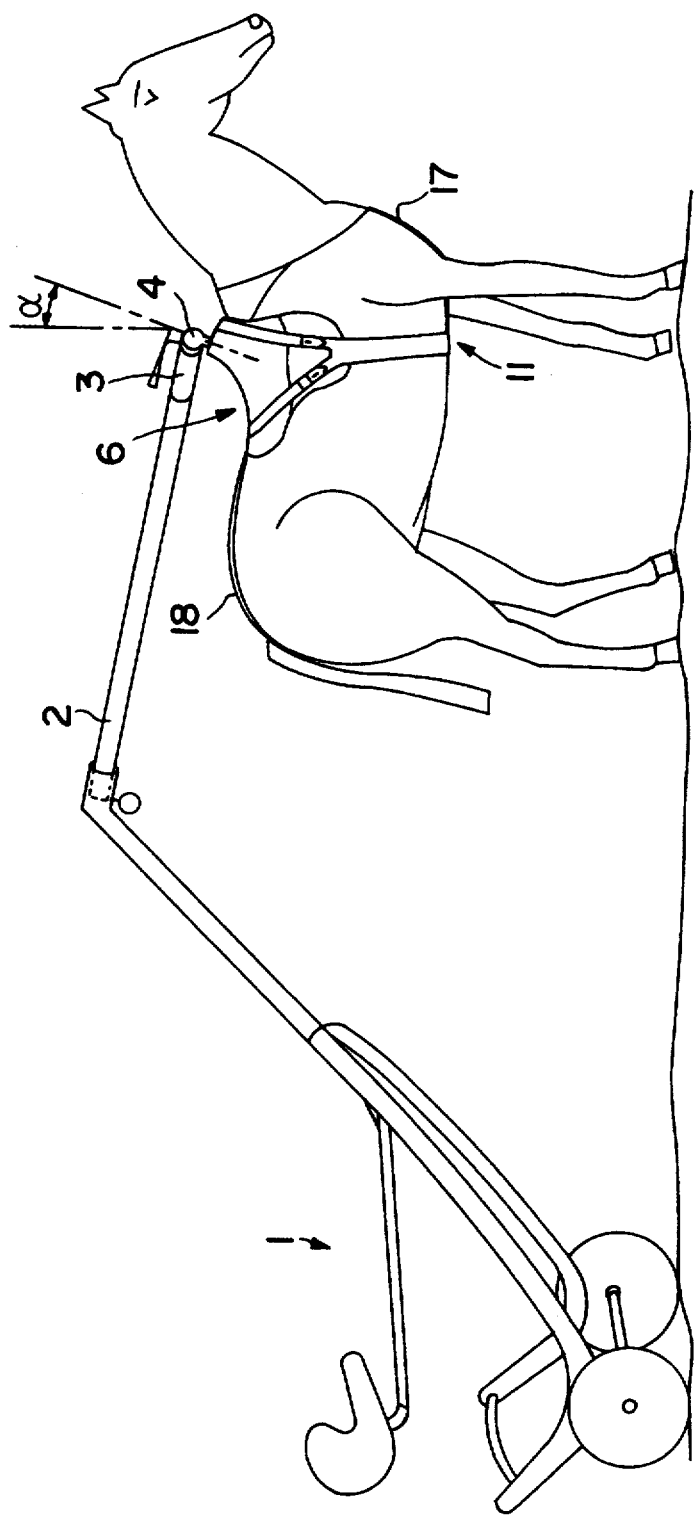
FIG. 1 is a schematic side view of a horse provided with a device according to the invention.

As seen in the drawings, the horse-drawn vehicle 1 carries at its front a single shaft 2 whose end is provided with a gripper socket 3 of a type known per se.

The socket is in engagement with a sphere 4 mounted at the forward end of the pommel 5 of saddle bow 6. The sphere is mounted rigidly fixedly to the pommel such that the forces imposed by the shaft on the sphere are integrally transmitted to the pommel. The socket 3 can thus undergo all the possible orientations about the sphere without applying a torsional force on the bow 6.

The sphere is carried by a short rod 7 mounted in the pommel 5 by any known means. For example, the rod can be screwed in a nut 8 embedded in the resin forming the body of the end of the pommel or else the pommel itself can be of glass fiber and the lower end of the rod is embedded by molding in the fiber. Other mountings (not shown) could be envisaged, for example a conical sleeve with a snap connection, etc.

Moreover, the rod is slightly inclined forwardly, at an angle $\alpha$ of about 7° with respect to the vertical.

Figure 2:
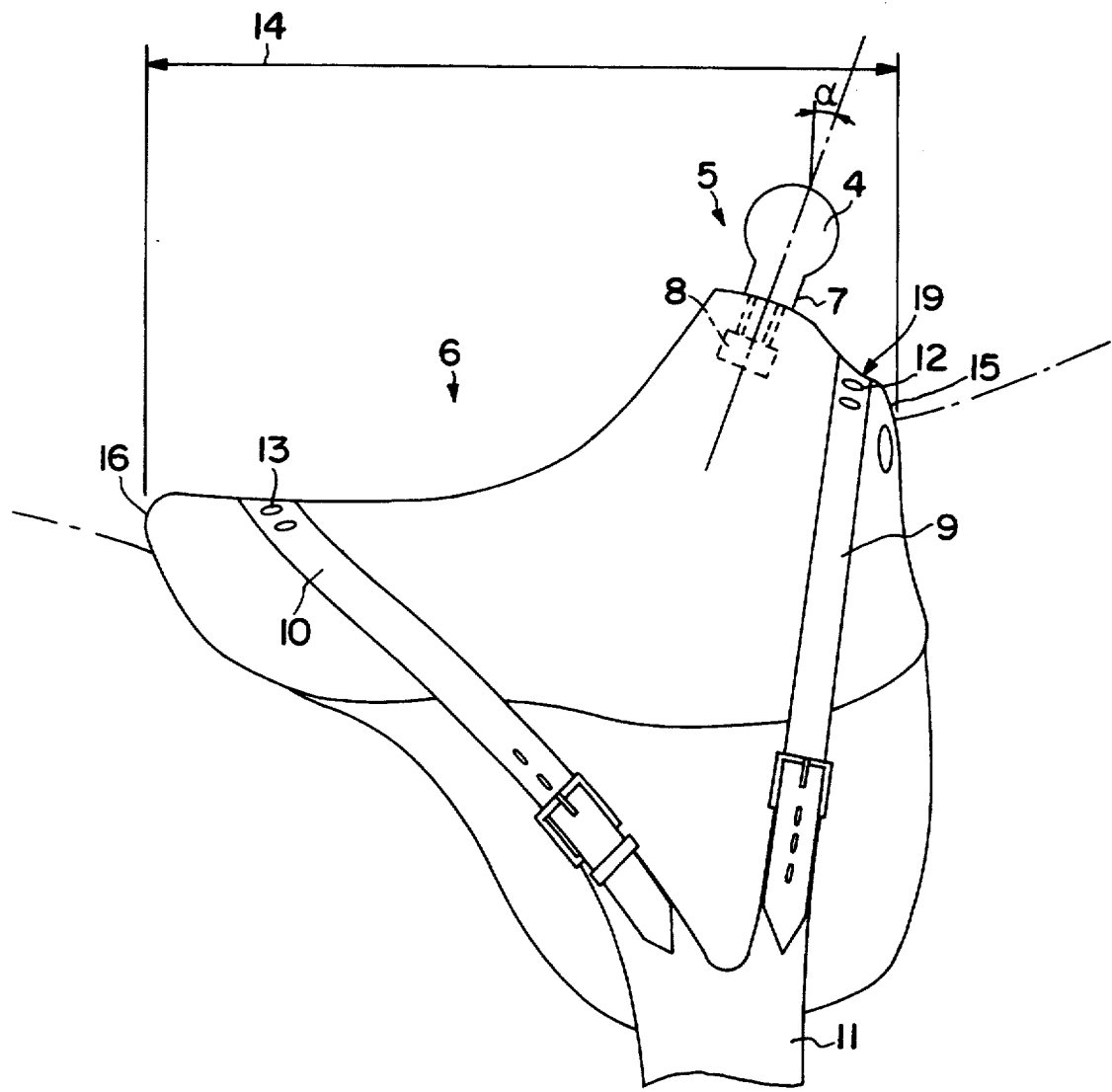
FIG. 2 is a schematic side view of the saddle bow according to the invention.

The bow is symmetrical and bears on each side a pair of straps of which a strap 9 is forward and a strap 10 is rearward which are both connected to the belly band 11. As shown in FIG. 2, the belly band is preferably in vertical alignment with the sphere or very slightly rearward thereof, and the bearing points 12, 13 of the straps 9 and 10 are spaced as far apart as possible. On each side, the straps are independently adjustable in length from each other so as to be adapted to apply the bow onto the back of the animal with a completely controlled force. Thus the resultant of the tractive forces applied by the sphere 4 on the saddle is in the same plane as the belly band 11. There is therefore no longer a friction force acting forwardly or rearwardly that could cause the saddle to slide.

The bow according to the invention has a large bearing surface on the back of the horse, obtained by the length 14 of the bow. It measures at least 350 mm between the ends of the pommel 15 and of the cantle 16, and preferably about 400 mm, and the bow extends substantially on opposite sides of the pommel, which is to say the sphere, forwardly just on each side of the withers 19 and rearwardly of the shoulders of the horse. Moreover, the lower surface of the bow comprises padding.

Moreover, as a variant, the bow can be of a thermoplastic material, which permits it to conform perfectly to the shape of the horse and ensures maximum contact on the back.

Thus the tractive forces imposed on the sphere are distributed regularly over all the surface of the bow: there is therefore no localized bearing point of a small surface permitting rubbing and wounding, and the force per unit of surface is insufficient to give rise to sliding.

The saddle thus described is preferably of the cavalry saddle type.

The belly band 11 is of substantial width, at least about 70 mm and preferably 150 mm, and is of the type of straps used in mounted gymnastics.

Furthermore, the equipment is completed, as shown in FIG. 1, in front by a collar 17 of the hunting type which is used as a breast collar, and rearwardly by a crupper-loop 18.

This harness device thus uses a saddle as its traction means, which is usually never the case, the small harness saddles not permitting carrying more than the weight of the harness and very little (about 10%) of the tractive forces.

The device permits using a vehicle under all the conditions of terrain, particularly broken terrain and slopes in which the positions on the slopes and the turns are frequently sharp, with no difficulty because of the freedom of rotation of the shaft on the sphere, and the forces applied on the saddle are always very regularly distributed.

Finally, the perfect distribution of the forces eliminates any veering effect, which permits using without risk the device for sporting events: races, obstacle courses, etc.

What is claimed is:

1. Harness device for horse-drawn vehicles, comprising in combination a saddle bow (6) having a pommel (15) and a cantle (16) and a length between the pommel and the cantle of at least about 350 mm, extending forwardly of each side of the withers (19) of a horse and comprising padding over all the surface bearing on the back of the horse, two pairs of lateral straps (9, 10) adjustable as to length mounted on the flanks of the saddle bow and connected to a belly band (11), a spherical ball (4) fixedly secured to the pommel of the saddle bow, and projecting upwardly, a shaft (2) for drawing a said vehicle, the shaft having a forward end bearing a socket (3) of a shape mating with that of the spherical ball and the socket enclosing the ball and being adapted to incline in all directions on the ball.

2. Harness device according to claim 1, wherein the spherical ball (4) is inclined forwardly upwardly lengthwise of the horse at an angle ($\alpha$) of about 7° with respect to the vertical.

3. Harness device according to claim 1, wherein the saddle bow (6) is a cavalry saddle bow.

4. Harness device according to claim 1, wherein the forward lateral strap (9) bears on the saddle bow at a forwardmost point and the rear strap (10) bears on the rear of the saddle bow such that the resultant of the forces exerted on the sphere and applied to the saddle bow will be parallel to a plane defined by the belly band.

5. Harness device according to claim 1, wherein the belly band (11) is of at least 70 mm width.

6. Harness device according to claim 1, wherein the pommel of the saddle bow includes a securement member (8) thereon integrated in the body of the pommel and receiving a rod (7) bearing said spherical ball.

* * * * *